US012789331B2

(12) United States Patent
Hirabayashi et al.

(10) Patent No.: US 12,789,331 B2
(45) Date of Patent: Nov. 10, 2026

(54) IMPACT TOOL

(71) Applicant: MAKITA CORPORATION, Anjo (JP)

(72) Inventors: Tokuo Hirabayashi, Anjo (JP); Haruki Tejima, Anjo (JP); Kazuma Aoki, Anjo (JP); Kazunori Kinoshita, Anjo (JP)

(73) Assignee: Makita Corporation, Anjo (JP)

( * ) Notice: Subject to any disclaimer, the term of this patent is extended or adjusted under 35 U.S.C. 154(b) by 0 days.

(21) Appl. No.: 19/175,029

(22) Filed: Apr. 10, 2025

(65) Prior Publication Data

US 2025/0235990 A1 Jul. 24, 2025

Related U.S. Application Data

(63) Continuation of application No. 18/599,282, filed on Mar. 8, 2024, now Pat. No. 12,390,909, which is a (Continued)

(30) Foreign Application Priority Data

Dec. 13, 2021 (JP) ................................. 2021-201914
Dec. 13, 2021 (JP) ................................. 2021-201915

(51) Int. Cl.
*B25B 21/02* (2006.01)
*B25B 23/18* (2006.01)
*B25F 5/02* (2006.01)

(52) U.S. Cl.
CPC .............. *B25B 21/02* (2013.01); *B25B 23/18* (2013.01); *B25F 5/02* (2013.01)

(58) Field of Classification Search
CPC ............ B25B 21/02; B25B 23/18; B25F 5/02
See application file for complete search history.

(56) References Cited

U.S. PATENT DOCUMENTS 4,936,171 A 6/1990 Berg
5,525,842 A 6/1996 Leininger
(Continued)

FOREIGN PATENT DOCUMENTS

DE 202015007649 U1 * 11/2015 .............. B25F 5/026
JP 2004174635 A 6/2004
(Continued)

OTHER PUBLICATIONS

Office Action from the Japanese Patent Office dispatched Sep. 9, 2025, in related Japanese application No. 2021-201914, and translation thereof.

(Continued)

*Primary Examiner* — Eyamindae C Jallow
(74) *Attorney, Agent, or Firm* — J-TEK LAW PLLC; Jeffrey D. Tekanic; Scott T. Wakeman

(57) ABSTRACT

An impact tool includes: a brushless motor; a spindle, which is rotated by the brushless motor; a hammer, which is held on the spindle; an anvil, which is impacted in a rotational direction by the hammer; a polymer housing, which houses the brushless motor; a hammer case, which is connected to the polymer housing and houses the hammer and the spindle; and a light unit, which is held on the hammer case and comprises a plurality of light-emitting devices. The maximum tightening torque of the anvil is 1,000 N·m or more and 2,500 N·m or less.

17 Claims, 9 Drawing Sheets

Related U.S. Application Data continuation of application No. 18/060,094, filed on Nov. 30, 2022, now Pat. No. 11,958,170.

(56) References Cited

U.S. PATENT DOCUMENTS

| | | | | |
|---|---|---|---|---|
| 5,584,565 | A | 12/1996 | Berg | |
| 7,726,863 | B2 | 6/2010 | Brandstaetter et al. | |
| 8,371,848 | B2 | 2/2013 | Okawa et al. | |
| 8,496,366 | B2 | 7/2013 | Leong | |
| 8,827,483 | B2 | 9/2014 | Dixon et al. | |
| 9,028,088 | B2 | 5/2015 | Vanko et al. | |
| 9,352,458 | B2 | 5/2016 | Friedman et al. | |
| 9,774,273 | B2 | 9/2017 | Suzuki et al. | |
| 10,525,582 | B2 | 1/2020 | Qiu et al. | |
| 10,850,383 | B1 | 12/2020 | Urban et al. | |
| 11,453,106 | B2 | 9/2022 | Kelly | |
| 12,194,602 | B2 | 1/2025 | Ogiso et al. | |
| 2003/0002934 | A1* | 1/2003 | Hsu | B25B 21/00 408/124 |
| 2003/0058638 | A1* | 3/2003 | Gillette | B25B 23/18 362/202 |
| 2003/0095402 | A1* | 5/2003 | Lin | B25B 23/18 362/253 |
| 2004/0174699 | A1* | 9/2004 | Minalga | B25B 23/18 362/119 |
| 2005/0157489 | A1* | 7/2005 | Oomori | B25B 23/18 362/119 |
| 2006/0092674 | A1 | 5/2006 | Belton et al. | |
| 2008/0074865 | A1 | 3/2008 | Lutz et al. | |
| 2008/0266845 | A1* | 10/2008 | Wu | A61B 90/35 362/157 |
| 2009/0256319 | A1 | 10/2009 | Seymour et al. | |
| 2010/0149790 | A1* | 6/2010 | Leong | B25F 5/021 362/119 |
| 2010/0214768 | A1 | 8/2010 | Dixon et al. | |
| 2010/0224033 | A1 | 9/2010 | Yeoh et al. | |
| 2011/0180286 | A1 | 7/2011 | Oomori et al. | |
| 2011/0187211 | A1 | 8/2011 | Matsunaga et al. | |
| 2011/0188232 | A1 | 8/2011 | Friedman et al. | |
| 2012/0224381 | A1 | 9/2012 | Hashimoto et al. | |
| 2013/0021783 | A1 | 1/2013 | Vanko et al. | |
| 2013/0155668 | A1 | 6/2013 | Rennecker | |
| 2013/0286635 | A1 | 10/2013 | Dixon et al. | |
| 2014/0008088 | A1 | 1/2014 | Chellew | |
| 2014/0036482 | A1 | 2/2014 | Vanko et al. | |
| 2014/0182869 | A1 | 7/2014 | Kumagai et al. | |
| 2015/0042246 | A1 | 2/2015 | Tadokoro et al. | |
| 2015/0069864 | A1 | 3/2015 | Nagahama et al. | |
| 2015/0283685 | A1* | 10/2015 | Kynast | H05B 45/10 362/119 |
| 2016/0204718 | A1 | 7/2016 | Koizumi et al. | |
| 2016/0354889 | A1 | 12/2016 | Ely et al. | |
| 2017/0173768 | A1* | 6/2017 | Dey, IV | B25B 21/02 |
| 2018/0085901 | A1 | 3/2018 | Leininger et al. | |
| 2018/0126538 | A1 | 5/2018 | Qiu et al. | |
| 2018/0222022 | A1 | 8/2018 | Kumagai et al. | |
| 2019/0091824 | A1 | 3/2019 | Chellew | |
| 2021/0028671 | A1 | 1/2021 | Chung et al. | |
| 2021/0060755 | A1 | 3/2021 | Kawai | |
| 2021/0094158 | A1 | 4/2021 | Kato et al. | |
| 2021/0122017 | A1 | 4/2021 | Kelly | |
| 2021/0222866 | A1 | 7/2021 | Niwa | |
| 2021/0379743 | A1 | 12/2021 | Schneider et al. | |
| 2022/0009064 | A1 | 1/2022 | Puzio | |
| 2022/0040829 | A1 | 2/2022 | Schneider et al. | |
| 2022/0190687 | A1 | 6/2022 | Fukuoka | |
| 2022/0193846 | A1 | 6/2022 | Okazaki et al. | |
| 2022/0193878 | A1 | 6/2022 | Tomayko et al. | |
| 2022/0203512 | A1 | 6/2022 | Kondo et al. | |
| 2022/0388134 | A1 | 12/2022 | Hozumi | |
| 2023/0147598 | A1 | 5/2023 | Tamura et al. | |
| 2023/0173650 | A1 | 6/2023 | Shinto et al. | |
| 2023/0182270 | A1 | 6/2023 | Hirabayashi et al. | |
| 2023/0256580 | A1 | 8/2023 | Yang et al. | |
| 2024/0308035 | A1 | 9/2024 | Nick et al. | |
| 2024/0351175 | A1 | 10/2024 | Friedman et al. | |

FOREIGN PATENT DOCUMENTS

| | | | |
|---|---|---|---|
| JP | 2008080484 | A | 4/2008 |
| JP | 2014107965 | A | 6/2014 |
| JP | 2015066636 | A | 4/2015 |
| JP | 2015139827 | A | 8/2015 |
| JP | 5900141 | B2 | 4/2016 |
| JP | 2016097498 | A | 5/2016 |
| JP | 2018183874 | A | 11/2018 |
| JP | 2021024044 | A | 2/2021 |
| JP | 2021112816 | A | 8/2021 |
| WO | 2011013853 | A2 | 2/2011 |
| WO | 2021220992 | A1 | 11/2021 |
| WO | 2023086237 | A1 | 5/2023 |

OTHER PUBLICATIONS

Office Action mailed Mar. 14, 2024, in related U.S. Appl. No. 18/060,103.

Office Action mailed Sep. 14, 2023, in U.S. Appl. No. 18/060,103, and examined claims 1-19.

Office Action from the Japanese Patent Office dispatched Sep. 2, 2025 in related Japanese application No. 2021-201915, and translation thereof.

Office Action from the Japanese Patent Office dispatched May 13, 2025 in related Japanese application No. 2021-201914, and machine translation thereof.

Office Action from the Japanese Patent Office dispatched May 7, 2025 in related Japanese application No. 2021-201915, and machine translation thereof.

* cited by examiner

FIG.5

| Company | Product | Number of Light-Emitting Devices | Maximum Tightening Torque [Nm] | Rated Voltage [V] | Weight [kg] | Overall Length [mm] | Maximum Rotational Speed [rpm] | Wrench Width [inch] |
|---|---|---|---|---|---|---|---|---|
| α | A | 3 | 192 | 18 | 0.95 | 129.5 | 2800 | 0.25 |
| | B | 3 | 339 | 12 | 0.91 | 133.4 | 2850 | 0.5 |
| | C | 1 | 949 | 18 | 2.72 | 223.8 | 1900 | 0.5 |
| β | D | 3 | 2576 | 18 | 9.52 | 455.7 | 1200 | 1 |
| | E | 1 | 2034 | 18 | 4.76 | 276.9 | 1650 | 1 |
| | F | 3 | 339 | 18 | 1.09 | 121.9 | 2400 | 0.375 |
| γ | G | 1 | 678 | 18 | 2.36 | 254 | 1900 | 0.5 |
| | H | 3 | 115 | 12 | 0.73 | 139.7 | 2600 | 0.375 |
| | I | 1 | 181 | 18 | 1.09 | 170.18 | 2800 | 0.5 |
| δ | J | 1 | 100 | 12 | 0.8 | 150 | 2700 | 0.375 |
| | K | 1 | 260 | 18 | 12 | 166 | 1700 | 0.5 |
| | L | 0 | 1057 | 18 | 2.4 | 238 | 1900 | 0.5 |

[Relationship Between Maximum Tightening Torque and Number of Light-Emitting Devices]

[Relationship Between Weight and Number of Light-Emitting Devices]

[Relationship Between Overall Length and Number of Light-Emitting Devices]

[Relationship Between Maximum Rotational Speed and Number of Light-Emitting Devices]

IMPACT TOOL

CROSS-REFERENCE

This application is a continuation of U.S. patent application Ser. No. 18/599,282, filed on Mar. 8, 2024, now U.S. Pat. No. 12,390,909, which is a continuation of U.S. patent application Ser. No. 18/060,094, filed on Nov. 30, 2022, now U.S. Pat. No. 11,958,170, which claims priority to Japanese Patent Application No. 2021-201914 filed on Dec. 13, 2021, and to Japanese Patent Application No. 2021-201915 filed on Dec. 13, 2021, the contents of both of which are incorporated herein by reference.

TECHNICAL FIELD

Techniques disclosed in the present specification relate to an impact tool.

BACKGROUND ART

A known impact driver comprising lights is disclosed in Japanese Patent No. 5900141.

SUMMARY

It is one non-limiting object of the present teachings to disclose techniques for improving the ergonomics and/or work efficiency of an impact tool, such as an impact wrench and/or an impact driver.

In one non-limiting aspect of the present teachings, an impact tool, such as an impact wrench or impact driver, may comprise: a brushless motor; a spindle, which is rotated by the brushless motor; a hammer, which is held on (and/or around) the spindle; an anvil, which is (configured to be) impacted in a rotational direction by the hammer; a resin (polymer) housing, which houses the brushless motor; and a hammer case, which is connected to the resin (polymer) housing and houses the hammer and the spindle. The impact tool may comprise a light unit, which is held on the hammer case and comprises a plurality of light-emitting devices. The maximum tightening torque of the anvil may be 1,000 N·m or more and 2,500 N·m or less.

According to the techniques disclosed in the present specification, an impact tool having improved ergonomics and/or work efficiency is provided.

BRIEF DESCRIPTION OF THE DRAWINGS

FIG. 5 is a table that shows the specifications of a variety of known impact tools.

DETAILED DESCRIPTION

Figure 1:
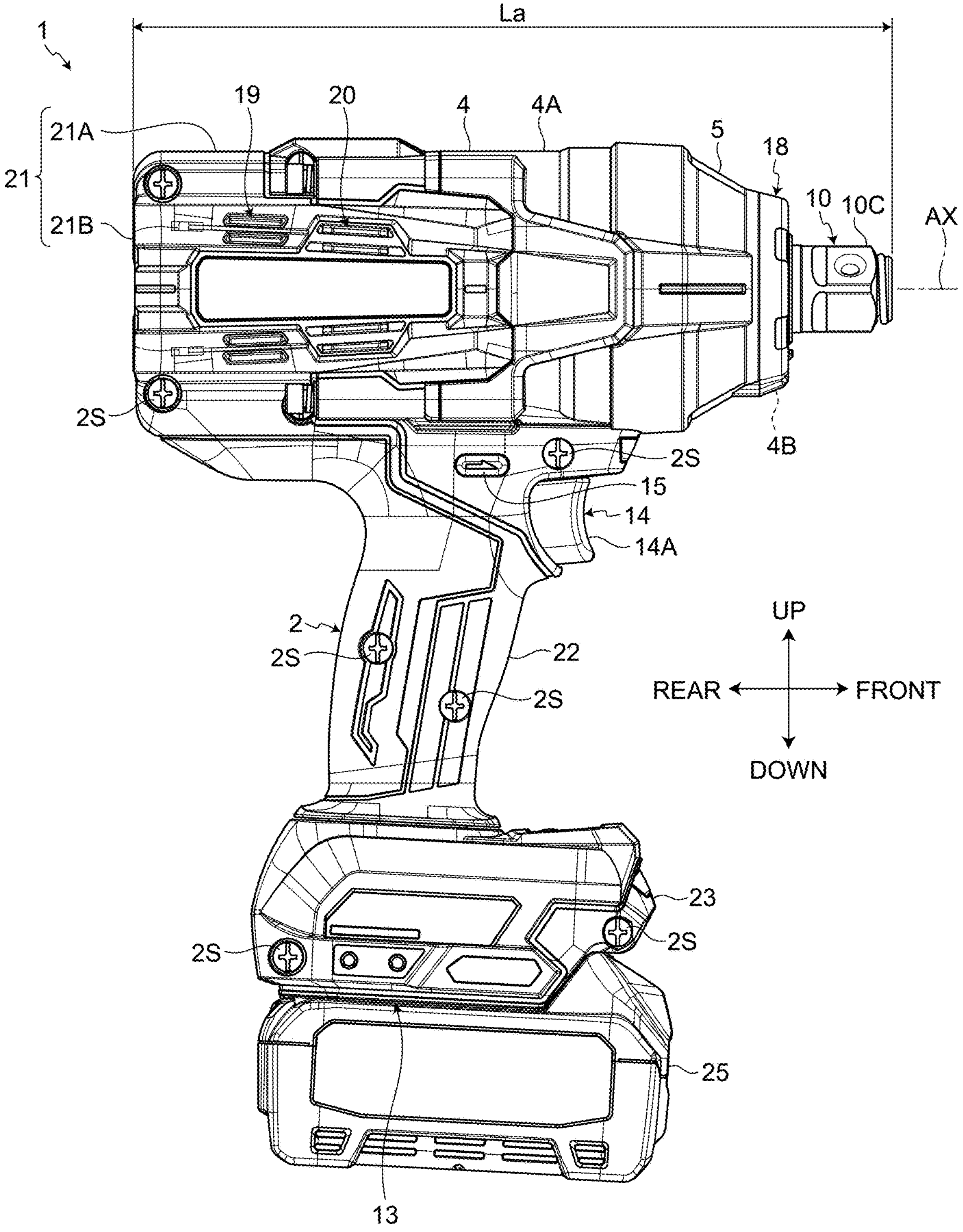
FIG. 1 is a side view that shows an impact tool according to one representative, non-limiting embodiment of the present teachings.

As was mentioned above, in one or more embodiments, an impact tool may comprise: a brushless motor; a spindle, which is rotated by the brushless motor; a hammer, which is held on the spindle; an anvil, which is impacted in a rotational direction by the hammer; a resin (polymer) housing, which houses the brushless motor; and a hammer case, which is connected to the resin (polymer) housing and houses the hammer and the spindle. The impact tool may comprise a light unit, which is held on the hammer case and comprises a plurality of light-emitting devices. The maximum tightening torque of the anvil may be 1,000 N·m or more and 2,500 N·m or less.

According to the above-mentioned configuration, because the light unit comprises the plurality of light-emitting devices, the work environment is brightly illuminated with illumination light. In addition, the maximum tightening torque of the anvil is 1,000 N·m or more and 2,500 N·m or less. Consequently, an impact tool having improved ergonomics and/or work efficiency is provided.

In one or more embodiments, at least three of the light-emitting devices may be provided.

According to the above-mentioned configuration, because the light unit comprises at least three of the light-emitting devices, the work environment is brightly illuminated with illumination light. Consequently, an impact tool having improved ergonomics and/or work efficiency is provided.

In one or more embodiments, a battery pack may be mounted on a battery-holding part, which is a portion of the resin (polymer) housing. The weight of the impact tool may be 2 kg or less.

According to the above-mentioned configuration, because the impact tool, with the battery pack mounted thereon, has a weight of 2 kg or less, an impact tool having improved ergonomics and/or work efficiency is provided.

In one or more embodiments, a battery pack may be mounted on a battery-holding part, which is a portion of the resin (polymer) housing. At least three of the light-emitting devices may be provided. The weight of the impact tool may be 2 kg or more and 9 kg or less.

According to the above-mentioned configuration, because the light unit comprises at least three of the light-emitting devices and the impact tool, with the battery pack mounted thereon, has a weight of 2 kg or more and 9 kg or less, an impact tool having improved ergonomics and/or work efficiency is provided.

In one or more embodiments, the spindle may be disposed forward of the brushless motor; the anvil may be disposed forward of the spindle; and the brushless motor may be housed in a motor-housing part, which is a portion of the resin (polymer) housing. The distance from a front-end portion of the anvil to a rear-end portion of the motor-housing part may be 155 mm or less.

According to the above-mentioned configuration, because the overall length of the impact tool, which is defined as the distance between the front-end portion of the anvil and the rear-end portion of the motor-housing part, is 155 mm or less, an impact tool having improved ergonomics and/or work efficiency is provided.

In one or more embodiments, the spindle may be disposed forward of the brushless motor; the anvil may be disposed forward of the spindle; and the brushless motor may be housed in a motor-housing part, which is a portion of the resin (polymer) housing. At least three of the light-emitting devices may be provided. The distance from a front-end portion of the anvil to a rear-end portion of the motor-housing part may be 200 mm or more and 400 mm or less.

According to the above-mentioned configuration, because the light unit comprises at least three of the light-emitting devices and the overall length of the impact tool, which is defined as the distance from the front-end portion of the anvil to the rear-end portion of the motor-housing part, is 200 mm or more and 400 mm or less, an impact tool having improved ergonomics and/or work efficiency is provided.

In one or more embodiments, the maximum rotational speed of the anvil may be 3,000 rpm or less.

According to the above-mentioned configuration, because the maximum rotational speed of the anvil is 3,000 rpm or less, an impact tool having improved ergonomics and/or work efficiency is provided.

In one or more embodiments, at least three of the light-emitting devices may be provided. The maximum rotational speed of the anvil may be 1,300 rpm or more and 2,300 rpm or less.

According to the above-mentioned configuration, because the light unit comprises at least three of the light-emitting devices and the maximum rotational speed of the anvil is 1,300 rpm or more and 2,300 rpm or less, an impact tool having improved ergonomics and/or work efficiency is provided.

In one or more embodiments, the anvil may have a quadrangular-column part. The dimension of one side of a cross section of the quadrangular-column part may be 0.375 inches or less.

According to the above-mentioned configuration, because the dimension of one side of a cross section of the quadrangular-column part is 0.375 inches or less, an impact tool having improved ergonomics and/or work efficiency is provided.

In one or more embodiments, the anvil may have a quadrangular-column part. At least three of the light-emitting devices may be provided. The dimension of one side of a cross section of the quadrangular-column part may be 0.6 inches or more and 0.9 inches or less.

According to the above-mentioned configuration, because the light unit comprises at least three of the light-emitting devices and the dimension of one side of a cross section of the quadrangular-column part is 0.6 inches or more and 0.9 inches or less, an impact tool having improved ergonomics and/or work efficiency is provided.

In one or more embodiments, the light unit may comprise: a light circuit board, which is disposed at least partially around the hammer case and holds the plurality of light-emitting devices; and optical members, which are disposed forward of the light-emitting devices and the light circuit board.

According to the above-mentioned configuration, the light-emitting devices and the light circuit board are protected by the optical members.

An embodiment is explained below, with reference to the drawings. In the embodiment, positional relationships among the parts are explained using the terms left, right, front, rear, up, and down. These terms indicate relative position or direction, wherein the center of an impact tool 1 is the reference. The impact tool 1 comprises a motor 6, which serves as a motive power supply.

In the embodiment, the direction parallel to rotational axis AX of the motor 6 is called the axial direction where appropriate, the direction that goes around rotational axis AX is called the circumferential direction or the rotational direction where appropriate, and the radial direction of rotational axis AX is called the radial direction where appropriate.

Rotational axis AX extends in a front-rear direction. One side in the axial direction is forward, and the other side in the axial direction is rearward. In addition, in the radial direction, a location that is proximate to or a direction that approaches rotational axis AX is called radially inward where appropriate, and a location that is distant from or a direction that leads away from rotational axis AX is called radially outward where appropriate.

Impact Tool

Figure 2:
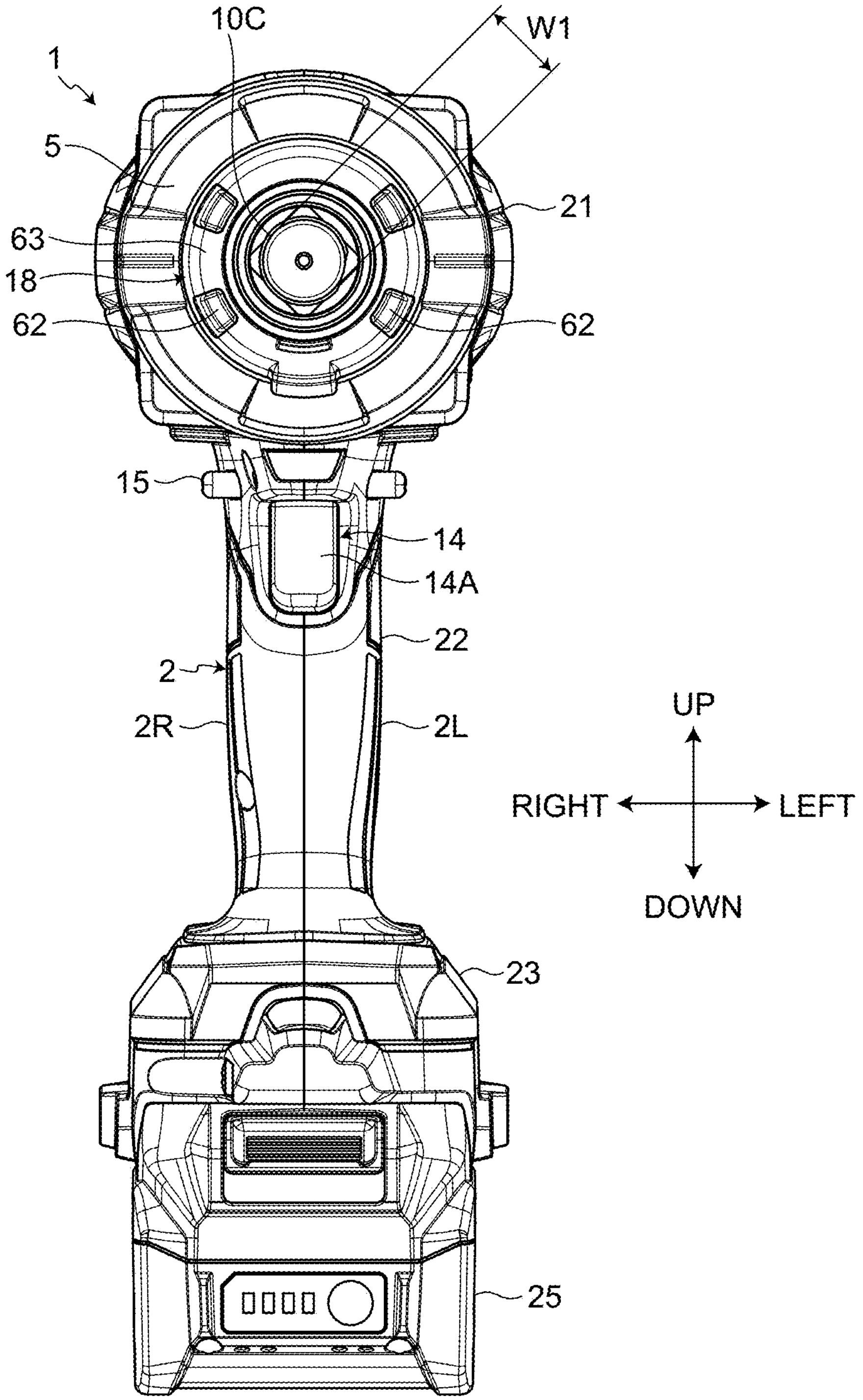
FIG. 2 is a front view that shows the impact tool according to the embodiment.
Figure 3:
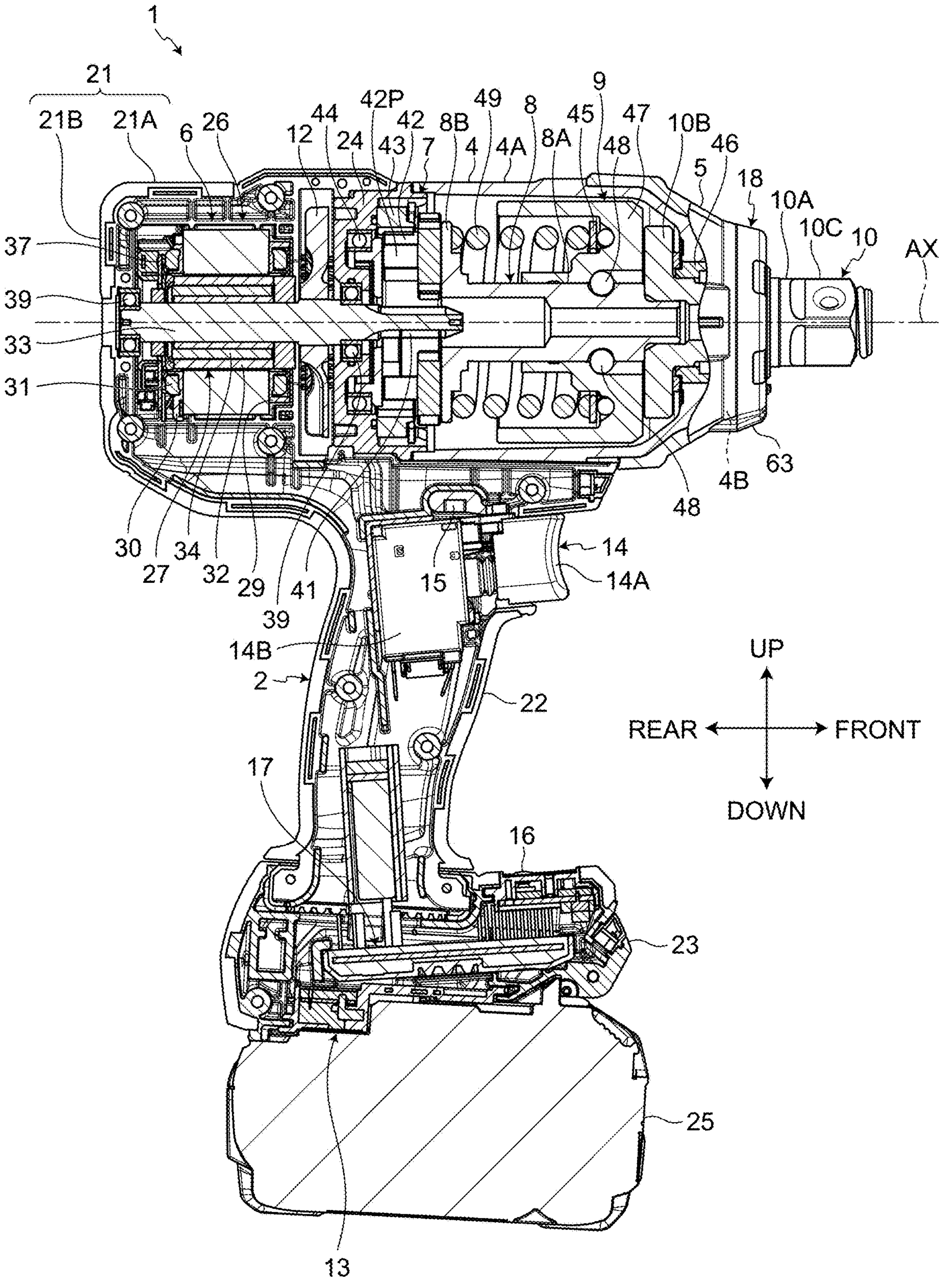
FIG. 3 is a cross-sectional view that shows the impact tool according to the embodiment.

FIG. 1 is a side view that shows the impact tool 1 according to one representative, non-limiting embodiment of the present teachings. FIG. 2 is a front view that shows the impact tool 1 according to the embodiment. FIG. 3 is a cross-sectional view that shows the impact tool 1 according to the embodiment. In the embodiment, the impact tool 1 is an impact wrench.

The impact tool 1 comprises a housing 2, a hammer case 4, a hammer-case cover 5, the motor 6, a speed-reducing mechanism 7, a spindle 8, an impact mechanism 9, an anvil 10, a fan 12, a battery-mounting part 13, a trigger switch 14, a forward/reverse-change lever 15, an action-mode-change switch 16, a controller 17, and a light unit 18.

The housing 2 houses at least the motor 6. The housing 2 is made of a synthetic resin (polymer), such as nylon. Thus, the housing 2 is a resin (polymer) housing. The housing 2 comprises a pair of half housings. The housing 2 comprises a left housing 2L and a right housing 2R, which is disposed rightward of the left housing 2L. The left housing 2L and the right housing 2R are fixed to each other by a plurality of screws 2S.

The housing 2 comprises a motor-housing part 21, a grip part 22, and a battery-holding part 23.

The motor-housing part 21 houses the motor 6. The motor-housing part 21 comprises: a tubular part 21A, which is disposed around the motor 6; and a rear-cover part 21B, which is disposed at a rear-end portion of the tubular part 21A.

The grip part 22 is gripped by a user. The grip part 22 protrudes downward from the tubular part 21A. The trigger switch 14 is provided at an upper portion of the grip part 22.

The battery-holding part 23 holds a battery pack 25 via the battery-mounting part 13. The battery-holding part 23 houses the controller 17. The battery-holding part 23 is connected to a lower-end portion of the grip part 22. In both the front-rear direction and the left-right direction, the dimension of the outer shape of the battery-holding part 23 is larger than the dimension of the outer shape of the grip part 22.

The hammer case 4 houses the speed-reducing mechanism 7, the spindle 8, the impact mechanism 9, and at least a portion of the anvil 10. The hammer case 4 is made of metal. The hammer case 4 has a tube shape. The hammer case 4 is connected to a front portion of the motor-housing part 21. The hammer case 4 is sandwiched between the left housing 2L and the right housing 2R. A bearing box 24 is fixed to a rear portion of the hammer case 4. The bearing box 24 is fixed to both the motor-housing part 21 and the hammer case 4.

The hammer-case cover 5 covers at least a portion of the surface of the hammer case 4. The hammer-case cover 5 is made of a synthetic resin (polymer), such as nylon. The hammer-case cover 5 protects the hammer case 4. The hammer-case cover 5 blocks contact between the hammer case 4 and objects around the impact tool 1. The hammer-case cover 5 blocks contact between the hammer case 4 and the user.

The motor 6 is the motive power supply of the impact tool 1. The motor 6 is an inner-rotor-type brushless motor. The motor 6 is housed in the motor-housing part 21, which is a portion of the housing 2.

The motor 6 comprises a stator 26 and a rotor 27. The stator 26 is supported in the motor-housing part 21. At least a portion of the rotor 27 is disposed in the interior of the stator 26. The rotor 27 rotates relative to the stator 26. The rotor 27 rotates about rotational axis AX, which extends in the front-rear direction.

The stator 26 comprises a stator core 28, a front insulator 29, a rear insulator 30, and coils 31.

The stator core 28 is disposed more radially outward than the rotor 27; i.e. the stator core 28 radially surrounds the rotor 27. The stator core 28 comprises a plurality of laminated steel sheets. Each of the steel sheets is a sheet made of a metal in which iron is the main component. The stator core 28 has a tube shape. The stator core 28 comprises a plurality of teeth that supports the coils 31.

The front insulator 29 is provided at a front portion of the stator core 28. The rear insulator 30 is provided at a rear portion of the stator core 28. The front insulator 29 and the rear insulator 30 are each an electrically insulating member that is made of a synthetic resin (polymer). The front insulator 29 is disposed such that it covers a portion of the surface of each of the teeth. The rear insulator 30 is disposed such that it covers a portion of the surface of each of the teeth.

The coils 31 are mounted on the stator core 28 via the front insulator 29 and the rear insulator 30. A plurality of the coils 31 is disposed. The coils 31 are respectively disposed around the teeth of the stator core 28 via (over) the front insulator 29 and the rear insulator 30. The coils 31 and the stator core 28 are electrically insulated from each other by the front insulator 29 and the rear insulator 30. Pairs of the coils 31 are respectively electrically connected via bus bars.

The rotor 27 rotates about rotational axis AX. The rotor 27 comprises a rotor core 32, a rotor shaft 33, and rotor magnets 34.

The rotor core 32 and the rotor shaft 33 are each made of steel. A front portion of the rotor shaft 33 protrudes forward from a front-end surface of the rotor core 32. A rear portion of the rotor shaft 33 protrudes rearward from a rear-end surface of the rotor core 32. The front portion and the rear portion of the rotor shaft 33 are each supported in a rotatable manner by rotor bearings 39. The rotor bearing 39 on the front side is held by the bearing box 24. The rotor bearing 39 on the rear side is held by the rear-cover part 21B. A front-end portion of the rotor shaft 33 is disposed in the internal space of the hammer case 4 through an opening in the bearing box 24. The rotor magnets 34 are fixed to the rotor core 32.

A sensor board 37 is mounted on the rear insulator 30. The sensor board 37 comprises: a circuit board, which has a disk shape wherein a hole is provided at the center; and a rotation-detection device, which is supported by the circuit board. The rotation-detection device detects the position of the rotor 27 in the rotational direction by detecting the positions of the rotor magnets 34.

A pinion gear 41 is formed at a front-end portion of the rotor shaft 33. The pinion gear 41 is coupled to at least a portion of the speed-reducing mechanism 7. The rotor shaft 33 is coupled to the speed-reducing mechanism 7 via the pinion gear 41.

The speed-reducing mechanism 7 couples the rotor shaft 33 and the spindle 8 to each other. The speed-reducing mechanism 7 transmits the rotation of the rotor 27 to the spindle 8. The speed-reducing mechanism 7 causes the spindle 8 to rotate at a rotational speed that is lower than the rotational speed of the rotor 27, but at higher torque. The speed-reducing mechanism 7 comprises a planetary-gear mechanism. The speed-reducing mechanism 7 is disposed more forward than the motor 6.

The speed-reducing mechanism 7 comprises a plurality of planet gears 42 disposed around the pinion gear 41 and an internal gear 43 disposed around the plurality of planet gears 42. The pinion gear 41, the planet gears 42, and the internal gear 43 are each housed in the hammer case 4 and the bearing box 24. Each of the planet gears 42 meshes with the pinion gear 41. The planet gears 42 are supported in a rotatable manner by the spindle 8 via pins 42P. The spindle 8 is rotated by the planet gears 42. The internal gear 43 has inner teeth, which mesh with the planet gears 42. The internal gear 43 is fixed to the bearing box 24. The internal gear 43 is always non-rotatable relative to the bearing box 24.

When the rotor shaft 33 rotates in response to the operation (energization) of the motor 6, the pinion gear 41 rotates, and the planet gears 42 revolve around the pinion gear 41. The planet gears 42 revolve while meshing with the inner teeth of the internal gear 43. In response to the revolving of the planet gears 42, the spindle 8, which is connected to the planet gears 42 via the respective pins 42P, rotates at a rotational speed that is lower than the rotational speed of the rotor shaft 33.

The spindle 8 is rotated by the motor 6. The spindle 8 rotates in response to the rotational force of the rotor 27 transmitted by the speed-reducing mechanism 7. The spindle 8 is housed in the hammer case 4. The spindle 8 is disposed forward of the motor 6. At least a portion of the spindle 8 is disposed forward of the speed-reducing mechanism 7.

The spindle 8 comprises a spindle-shaft part 8A and a flange part 8B, which is disposed at a rear portion of the spindle-shaft part 8A. The spindle-shaft part 8A protrudes forward from the flange part 8B. The planet gears 42 are supported in a rotatable manner by the flange part 8B via the respective pins 42P. The rotational axis of the spindle 8 and rotational axis AX of the motor 6 coincide with each other. The spindle 8 rotates about rotational axis AX.

The spindle 8 is supported in a rotatable manner by a spindle bearing 44. The spindle bearing 44 is held by the bearing box 24.

The impact mechanism 9 impacts the anvil 10 in the rotational direction in response to transmission of the rotational force of the spindle 8. The rotational force of the motor 6 is transmitted to the impact mechanism 9 via the speed-reducing mechanism 7 and the spindle 8. The impact mechanism 9 comprises a hammer 47, balls 48, and a coil spring 49. The impact mechanism 9, which comprises the hammer 47, is housed in the hammer case 4.

The hammer 47 is configured to impact (strike) the anvil 10 in the rotational direction, as will be further described below. The hammer 47 is held on the spindle 8. The hammer 47 is disposed around the spindle-shaft part 8A. The balls 48 are disposed between the spindle 8 and the hammer 47. The coil spring 49 is supported by both the spindle 8 and the hammer 47.

The hammer 47 is rotatable, together with the spindle 8, in response to transmission of the rotational force of the spindle 8. The rotational axis of the hammer 47, the rotational axis of the spindle 8, and rotational axis AX of the motor 6 coincide with each other. The hammer 47 rotates about rotational axis AX.

Each of the balls 48 is made of a metal such as steel. The balls 48 are disposed between the spindle-shaft part 8A and the hammer 47. The spindle 8 has spindle grooves, in which at least portions of the balls 48 are respectively disposed. The spindle grooves are provided in portions of an outer surface of the spindle-shaft part 8A. The hammer 47 has hammer grooves, in which at least portions of the balls 48 are respectively disposed. The hammer grooves are provided in portions of an inner surface of the hammer 47. The balls 48 are respectively disposed between the spindle grooves and the hammer grooves. The balls 48 can respectively roll in each of the interiors of the spindle grooves and the interiors of the hammer grooves. The hammer 47 is capable of moving along with the balls 48. The spindle 8 and the hammer 47 are capable of relative movement in both the axial direction and the rotational direction within a movable range that is defined by the spindle grooves and the hammer grooves.

The coil spring 49 generates an elastic restoring force, which causes (biases) the hammer 47 to move forward. The coil spring 49 is disposed between the flange part 8B and the hammer 47. A recessed portion is provided on a rear surface of the hammer 47. The recessed portion recesses forward from a rear surface of the hammer 47. A washer 45 is provided in the interior of the recessed portion. A rear-end portion of the coil spring 49 is supported by the flange part 8B. A front-end portion of the coil spring 49 is supported by the washer 45.

The anvil 10 is the output part of the impact tool 1, on which a tool accessory is mounted. The anvil 10 is disposed forward of the spindle 8. The anvil 10 is connected to a front-end portion of the spindle-shaft part 8A. At least a portion of the anvil 10 is disposed forward of the hammer 47. The anvil 10 comprises a quadrangular-column part 10C, on which a socket, which is a tool accessory, is mounted.

The anvil 10 comprises an anvil-shaft part 10A and anvil-projection parts 10B. The quadrangular-column part 10C is provided at a front-end portion of the anvil-shaft part 10A. The anvil-projection parts 10B protrude radially outward from a rear-end portion of the anvil-shaft part 10A.

The anvil 10 is supported in a rotatable manner by a bearing 46. The rotational axis of the anvil 10, the rotational axis of the hammer 47, the rotational axis of the spindle 8, and rotational axis AX of the motor 6 coincide with each other. The anvil 10 rotates about rotational axis AX. The bearing 46 is held by the hammer case 4. An iron sleeve (e.g., made of an oil-impregnated metal) is an illustrative example of the bearing 46.

At least portions of the hammer 47 are capable of making contact with the anvil-projection parts 10B. Hammer-projection parts, which protrude forward, are provided at a front portion of the hammer 47. The hammer-projection parts of the hammer 47 and the anvil-projection parts 10B are capable of making contact with each another. In the state in which the hammer 47 and the anvil-projection parts 10B are in contact with each another, the anvil 10 rotates together with the hammer 47 and the spindle 8 in response to the operation (energization) of the motor 6.

However, the anvil 10 is always configured to be impacted (struck) in the rotational direction by the hammer 47. For example, during screw-tightening work, there are situations in which, when the load that is acting on the anvil 10 becomes high (exceeds a predetermined threshold), the anvil 10 can no longer be caused to rotate merely by the power generated by the motor 6. Instead, when the anvil 10 can no longer be caused to rotate merely by the power generated by the motor 6, rotation of the anvil 10 and the hammer 47 will temporarily stop. The spindle 8 and the hammer 47 can move relative to each another in the axial direction and the circumferential direction via the balls 48. Even though rotation of the hammer 47 temporarily stops, rotation of the spindle 8 continues owing to the power generated by the motor 6. In the state in which rotation of the hammer 47 has temporarily stopped but the spindle 8 continues to rotate, the balls 48 move rearward while being guided by the respective spindle grooves and hammer grooves. The hammer 47 receives a force from the balls 48 and moves rearward along with the balls 48. That is, in the state in which the rotation of the anvil 10 is temporarily stopped, the hammer 47 moves rearward in response to the rotation of the spindle 8. The contact between the hammer 47 and the anvil-projection parts 10B is released by the movement of the hammer 47 rearward.

As was noted above, because the coil spring 49 generates an elastic restoring force, it causes (urges) the hammer 47 to move forward. Therefore, after the hammer 47 has been caused to move rearward, it will subsequently move forward owing to the elastic force of the coil spring 49. When the hammer 47 moves forward, it receives a force in the rotational direction from the balls 48. That is, the hammer 47 moves forward while rotating. When the hammer 47 moves forward while rotating, the hammer 47 makes contact with (impacts, strikes) the anvil-projection parts 10B while rotating. Thereby, the anvil-projection parts 10B are impacted in the rotational direction by the hammer 47. At this time, both the power of the motor 6 and the inertial force of the hammer 47 act on the anvil 10. As a result, the anvil 10 can be caused to rotate about rotational axis AX with a higher torque.

The fan 12 generates an airflow for cooling the motor 6. The fan 12 is fixed to a front portion of the rotor shaft 33. The fan 12 rotates in response to the rotation of the rotor 27. In other words, in response to the rotor shaft 33 rotating, the fan 12 rotates together with the rotor shaft 33. The motor-housing part 21 is provided with both air-intake openings 19 and air-exhaust openings 20. In response to the rotation of the fan 12, air in the external space of the housing 2 flows into the internal space of the housing 2 via the air-intake openings 19. The air that has flowed into the internal space of the housing 2 flows through the internal space of the housing 2, and thereby cools the motor 6. In response to the rotation of the fan 12, the air that has flowed through the internal space of the housing 2 flows out to the external space of the housing 2 via the air-exhaust openings 20.

The battery-mounting part 13 is connected to the battery pack 25. The battery pack 25 is mounted on the battery-mounting part 13. The battery pack 25 is detachable from the battery-mounting part 13. The battery-mounting part 13 is disposed at a lower portion of the battery-holding part 23. The battery pack 25 is mounted on the battery-holding part 23, which is a portion of the housing 2, via the battery-mounting part 13.

The battery pack 25 comprises secondary batteries. In the embodiment, the battery pack 25 comprises rechargeable lithium-ion batteries. By being mounted on the battery-mounting part 13, the battery pack 25 can supply electric power (current) to the impact tool 1. The motor 6 operates (is energized) using electric power supplied from the battery pack 25. The controller 17 operates (is powered) using electric power supplied from the battery pack 25.

In the embodiment, the rated voltage of the battery pack 25 is 18 V.

The trigger switch 14 is manipulated (e.g., pressed) by the user in order to start (the energization of) the motor 6. The trigger switch 14 is provided on the grip part 22. The trigger switch 14 comprises a trigger lever 14A and a switch main body 14B. The switch main body 14B is housed in the grip part 22. The trigger lever 14A protrudes forward from an upper portion of a front portion of the grip part 22. In response to the trigger lever 14A being manipulated by the user, the motor 6 is switched between operation (energization) and stoppage.

The forward/reverse-change lever 15 is manipulated (pressed, slid) by the user in order to change the rotational direction of the motor 6 from one of the forward-rotational direction and the reverse-rotational direction to the other. The forward/reverse-change lever 15 is provided at an upper portion of the grip part 22. In response to the forward/reverse-change lever 15 being manipulated, the rotational direction of the motor 6 is changed from one of the forward-rotational direction and the reverse-rotational direction to the other. In response to the rotational direction of the motor 6 being changed, the rotational direction of the spindle 8 is changed.

The action-mode-change switch 16 is manipulated by the user in order to change the control mode of the motor 6, e.g., a sequence of motor rotational speeds. The action-mode-change switch 16 is provided on the battery-holding part 23.

The controller 17 outputs control signals that control at least (the energization of) the motor 6. The controller 17 is housed in the battery-holding part 23. The controller 17 comprises a circuit board on which a plurality of electronic components is mounted. A processor, such as a CPU (central processing unit); nonvolatile memory, such as ROM (read-only memory) and storage; volatile memory, such as RAM (random-access memory); transistors; and resistors are illustrative examples of the electronic components mounted on the circuit board.

Light Unit

Figure 4:
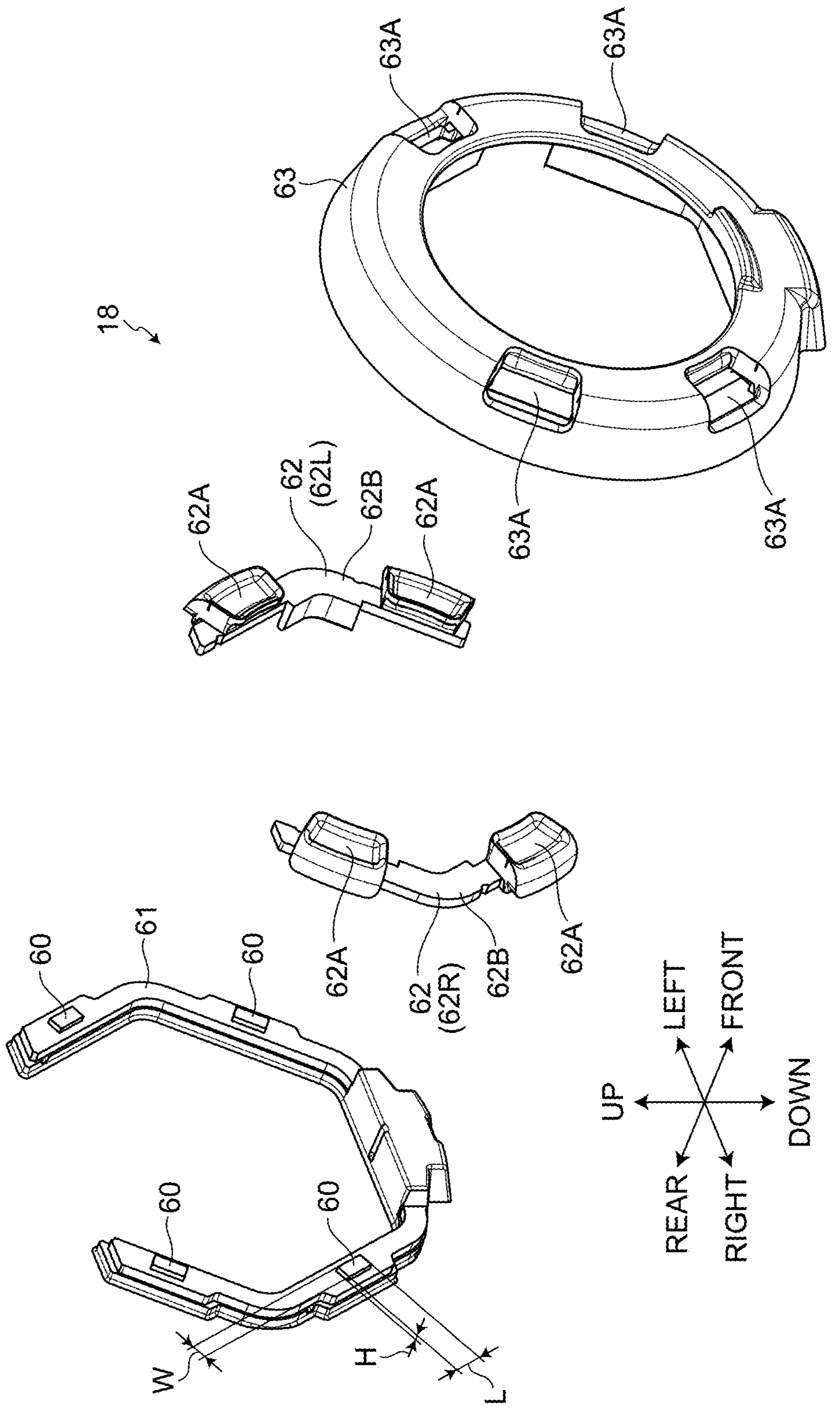
FIG. 4 is an exploded, oblique view, viewed from the front, that shows a light unit according to the embodiment.

FIG. 4 is an exploded, oblique view, viewed from the front, that shows the light unit 18 according to the embodiment. The light unit 18 emits illumination light. The light unit 18 illuminates the anvil 10 and the periphery of the anvil 10 with illumination light. The light unit 18 illuminates forward of the anvil 10 with illumination light. In addition, the light unit 18 illuminates the tool accessory mounted on the anvil 10 and the periphery of the tool accessory with illumination light.

The light unit 18 is held on the hammer case 4. The light unit 18 is disposed at a front portion of the hammer case 4. The light unit 18 is disposed at least partially around the hammer case 4.

The hammer case 4 comprises a hammer-housing part 4A and a bearing-retaining part 4B. The hammer-housing part 4A has a tube shape. The hammer-housing part 4A is disposed around the impact mechanism 9. The hammer-housing part 4A houses at least the hammer 47. The bearing-retaining part 4B has a tube shape. The bearing-retaining part 4B is disposed more forward than the hammer-housing part 4A. The outer diameter of the bearing-retaining part 4B is smaller than the outer diameter of the hammer-housing part 4A. The bearing-retaining part 4B is disposed around the bearing 46. The bearing-retaining part 4B holds the bearing 46.

The light unit 18 is disposed around the bearing-retaining part 4B. A rear portion of the hammer-housing part 4A is housed in the motor-housing part 21.

The light unit 18 comprises light-emitting devices 60, a light circuit board 61, optical members 62, and a light cover 63.

Each of the light-emitting devices 60 is a light source that emits illumination light. Light-emitting diodes (LEDs: light-emitting diodes) are illustrative examples of the light-emitting devices 60.

The plurality of the light-emitting devices 60 is provided such that the light-emitting devices 60 are spaced apart around the anvil 10. The number of light-emitting devices 60 is, for example, two or more and eight or less. At least three of the light-emitting devices 60 may be provided. The number of light-emitting devices 60 may be, for example, three or more and six or less. In the embodiment, four of the light-emitting devices 60 are provided around the anvil 10.

The light circuit board 61 supports the plurality of light-emitting devices 60. The light circuit board 61 is disposed at least partially around the hammer case 4. In the embodiment, the light circuit board 61 is disposed partially around the hammer case 4. The light circuit board 61 is disposed partially around the bearing-retaining part 4B.

The light circuit board 61 comprises a printed wiring board (PWB) or printed circuit board (PCB). The light circuit board 61 has wiring (traces, conductive paths) that is (are) connected to the light-emitting devices 60. Electric power (current) is supplied to the light-emitting devices 60 via the wiring of the light circuit board 61. The light-emitting devices 60 are mounted on a front surface of the light circuit board 61. In the embodiment, the light unit 18 comprises surface-mount-type (SMD: surface-mount device) light-emitting diodes. Each of the light-emitting devices 60 comprises a so-called chip LED.

The voltage input to each one of the light-emitting devices 60 is 1.0 volt (V) or more and 10.0 V or less. The voltage applied to each one of the light-emitting devices 60 may be, for example, 2.0 V or more and 8.0 V or less or may be 2.5 V or more and 5.0 V or less.

Electric current supplied to each one of the light-emitting devices 60 is 5 milliamps (mA) or more and 100 mA or less. Electric current supplied to each one of the light-emitting devices 60 may be 10 mA or more and 50 mA or less or may be 15 mA or more and 30 mA or less.

The light beam of the illumination light emitted from each one of the light-emitting devices 60 is 1 lumen (lm) or more and 20 lm or less. The light beam of the illumination light emitted from each one of the light-emitting devices 60 may be 3 lm or more and 15 lm or less or may be 5 lm or more and 10 lm or less.

The luminous intensity of the illumination light emitted from each one of the light-emitting devices 60 is 0.5 candela (cd) or more and 10 cd or less. The luminous intensity of the illumination light emitted from each one of the light-emitting devices 60 may be 1 cd or more and 7 cd or less or may be 2 cd or more and 5 cd or less.

As shown in FIG. 4, the outer shape of each one of the light-emitting devices 60 is substantially rectangular-parallelepiped-shaped.

Width W of each one of the light-emitting devices 60 is 0.5 millimeters (mm) or more and 3 mm or less. Width W of each one of the light-emitting devices 60 may be 1 mm or more and 2 mm or less or may be 1.2 mm or more and 1.8 mm or less.

Length L of each one of the light-emitting devices 60 is 1.5 mm or more and 6 mm or less. Length L of each one of the light-emitting devices 60 may be 2.5 mm or more and 3.5 mm or less.

Thickness H of each one of the light-emitting devices 60 is 0.2 mm or more and 2 mm or less. Thickness H of each one of the light-emitting devices 60 may be 0.3 mm or more and 1 mm or less or may be 0.4 mm or more and 0.8 mm or less.

The optical members 62 are disposed forward of the light-emitting devices 60 and the light circuit board 61. Each of the optical members 62 comprises: light-transmitting parts 62A, which transmits the illumination light emitted from the corresponding light-emitting devices 60; and a coupling part 62B, which is connected to the light-transmitting parts 62A.

In the embodiment, the optical members 62 comprise an optical member 62L, which is disposed more leftward than rotational axis AX, and an optical member 62R, which is disposed more rightward than rotational axis AX. As can be seen, e.g., in FIG. 4, the optical members 62L, 62R do not directly contact each other when integrated into the light cover 63, but are indirectly connected (linked) to each other via the material of the light cover 63 in the integrated state. The optical member 62L comprises two of the light-transmitting parts 62A. The optical member 62R comprises two of the light-transmitting parts 62A. Of the four light-emitting devices 60, the two light-emitting devices 60 disposed more leftward than rotational axis AX respectively oppose the two light-transmitting parts 62A of the optical member 62L. Of the four light-emitting devices 60, the two light-emitting devices 60 disposed more rightward than rotational axis AX respectively oppose the two light-transmitting parts 62A of the optical member 62R.

Each of the optical members 62 is formed of an optically transmissive synthetic resin (polymer). In the embodiment, each of the optical members 62 is formed of a polycarbonate resin (polymer). It is noted that each of the optical members 62 may be formed of an acrylic resin (polymer).

Each of the light-transmitting parts 62A has a lens function. Each of the light-transmitting parts 62A refracts illumination light emitted from the corresponding light-emitting device 60. It is noted that each of the light-transmitting parts 62A does not have to have a lens function.

The light cover 63 is disposed forward of the light-emitting devices 60 and the light circuit board 61. In the embodiment, the light cover 63 is substantially ring-shaped.

The light cover 63 is formed of a synthetic resin (polymer). The light cover 63 may be formed of a material the same as that of the optical members 62. The light cover 63 may be formed of a material that differs from that of the optical members 62. In the embodiment, the light cover 63 is formed of a polycarbonate resin (polymer). It is noted that the light cover 63 may be formed of an acrylic resin (polymer). The optical members 62 and the light cover 63 are integrally molded. The optical members 62 and the light cover 63 are integrated by, for example, insert molding.

As can be seen in FIG. 4, openings 63A are provided spaced part in different portions of the light cover 63. The light-transmitting parts 62A of the optical members 62 are respectively disposed in the openings 63A of the light cover 63 such that the light-transmitting parts 62A are separated from each other on the outer surface of the light cover 63. The light-transmitting parts 62A are not covered by the light cover 63. That is, the light cover 63 is not disposed forward or rearward of the light-transmitting parts 62A. The coupling parts 62B of the optical members 62 are fixed to the light cover 63.

The optical members 62 and the light cover 63 are disposed around the bearing-retaining part 4B. The optical members 62 and the light cover 63 are supported on the hammer case 4 via the hammer-case cover 5 such that a rearmost surface of the optical members 62 is located forward of a frontmost surface of the hammer-case cover 5, as can be understood by viewing FIGS. 3 and 4 together. In addition, a rearmost surface of light circuit board 61 is also located forward of the frontmost surface of the hammer-case cover 5.

The optical members 62 and the light cover 63 protect the light-emitting devices 60 and the light circuit board 61. The optical members 62 and the light cover 63 block contact between objects around the impact tool 1 on one side and the light-emitting devices 60 and the light circuit board 61 on the other side. The optical members 62 and the light cover 63 are integrally molded such that a gap is not formed between the optical members 62 and the light cover 63. The optical members 62 and the light cover 63 have a dustproofing function that inhibits the ingress of moisture to the light-emitting devices 60 and the light circuit board 61. The optical members 62 and the light cover 63 have a dustproofing function that inhibits the ingress of dust to the light-emitting devices 60 and the light circuit board 61.

Relationship Between Maximum Tightening Torque and Number of Light-Emitting Devices FIG. 5 is a table that shows the specifications of a variety of known impact wrenches according. More particularly, FIG. 5 shows the specifications for: Product A, Product B, and Product C, which are impact wrenches manufactured and sold by Company α; Product D, Product E, and Product F, which are impact wrenches manufactured and sold by Company β; Product G, Product H, and Product I, which are impact wrenches manufactured and sold by Company γ; and Product J, Product K, and Product L, which are impact wrenches manufactured and sold by Company δ. Each product from Product A to Product L has structural elements equivalent to the structural elements of the impact tool 1, which was described above with reference to FIG. 1 to FIG. 4. A battery pack is mounted on each product from Product A to Product L.

The number of light-emitting devices, the maximum tightening torque [N·m] of the anvil, the rated voltage [V] of the battery pack, the weight [kg] of the impact wrench in the state in which the battery pack is mounted, the overall length [mm] indicating the distance from the front-end portion of the anvil to the rear-end portion of the motor-housing part, the maximum rotational speed [rpm] of the anvil, and the wrench width [inches], which is defined as the dimension of one side of a cross section of the quadrangular-column part, are illustrative examples of the specifications of the impact wrench.

As shown in FIG. 5, the number of light-emitting devices is three for Product A, and similarly is three for Product B, one for Product C, three for Product D, one for Product E, three for Product F, one for Product G, three for Product H, one for Product I, one for Product J, one for Product K, and zero for Product L.

As shown in FIG. 5, the maximum tightening torque is 192 N·m for Product A, and, expressed in a similar manner, is 339 N·m for Product B, 949 N·m for Product C, 2,576 N·m for Product D, 2,034 N·m for Product E, 339 N·m for Product F, 678 N·m for Product G, 115 N·m for Product H, 181 N·m for Product I, 100 N·m for Product J, 260 N·m for Product K, and 1,057 N·m for Product L.

The values of the rated voltage (V) of the battery pack, the weight (kg) of the impact wrench in the state in which the battery pack is mounted, the overall length (mm), which is defined as the distance from the front-end portion of the anvil to the rear-end portion of the motor-housing part, the maximum rotational speed (rpm) of the anvil, and the wrench width (inches), which is defined as the dimension of one side of a cross section of the quadrangular-column part, are as shown in FIG. 5.

In each product from Product A to Product L, the rated voltage of the battery pack is roughly 18 V.

Figure 6:
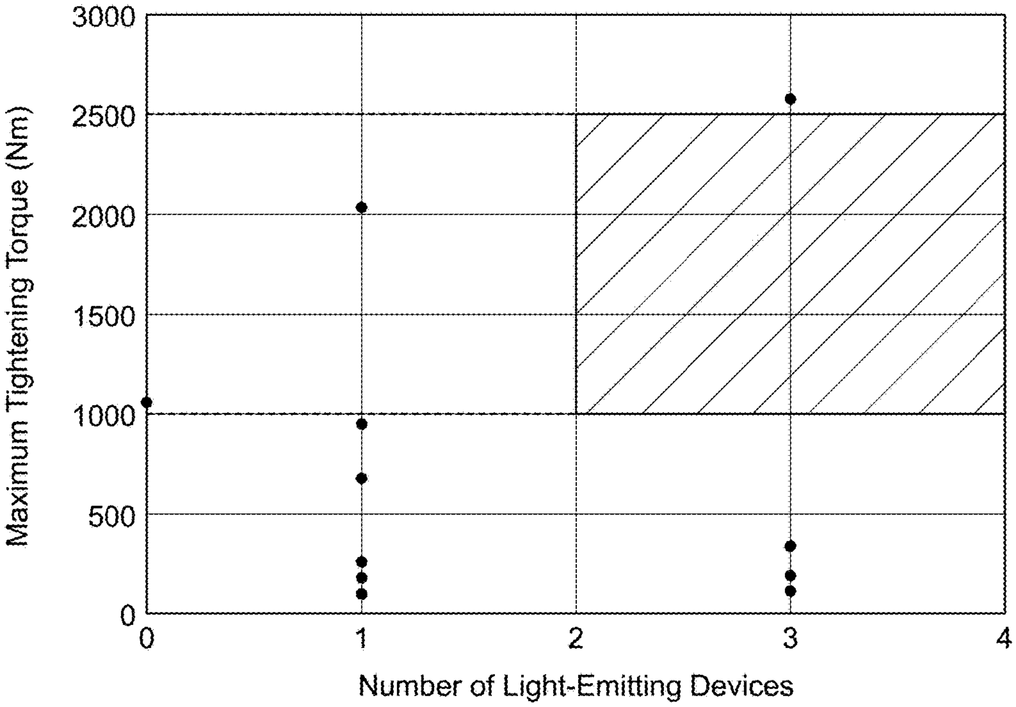
FIG. 6 is a graph that shows the relationship between maximum tightening torque of an anvil and number of light-emitting devices according to the above-described known impact tools and the embodiment.

FIG. 6 is a graph that shows the relationship between maximum tightening torque of the anvil and number of light-emitting devices according to both the above-described known impact tools and the embodiment. In the graph shown in FIG. 6, the abscissa is the number of light-emitting devices, and the ordinate is the maximum tightening torque of the anvil. The points shown in FIG. 6 plot the relationship between maximum tightening torque of the anvil and number of the light-emitting devices for each product from Product A to Product L shown in FIG. 5.

To provide an impact tool 1 having improved ergonomics and/or work efficiency, it is effective to brightly illuminate the work environment with illumination light using the light unit 18. In addition, for the same purpose, it is effective to shorten the overall length. On the other hand, if the maximum tightening torque becomes large, there is a tendency for the overall length of the impact tool 1 to become large. It is important to decide on a suitable tradeoff between overall length and maximum tightening torque of the impact tool 1.

As described above, the impact tool 1 comprises a plurality of structural elements, such as the motor 6, the spindle 8, the impact mechanism 9, the anvil 10, and the light unit 18. By optimizing these structural elements, an improved impact tool 1 can be provided. In the present specification, the structural elements of the impact tool 1 are optimized, and thereby the impact tool 1, in which ergonomics and/or work efficiency is (are) better than in the above-described known impact wrenches, is provided.

With regard to the impact tool 1 according to the embodiment, the battery pack 25 having a rated voltage of 18V is mounted.

As shown by the hatched area in FIG. 6, the impact tool 1 according to the embodiment comprises the plurality of light-emitting devices 60, and the maximum tightening torque of the anvil 10 is 1,000 N·m or more and 2,500 N·m or less. An impact wrench comprising a plurality of light-emitting devices and wherein the maximum tightening torque of the anvil 10 is 1,000 N·m or more and 2,500 N·m or less does not exist in the above-described known impact tools.

Relationship Between Weight and Number of Light-Emitting Devices

In addition, to provide an impact tool 1 having improved ergonomics and/or work efficiency, it is effective to optimize the weight of the impact tool 1. In the embodiment, the weight of the impact tool is the weight of the impact tool in the state in which the battery pack is mounted.

Figure 7:
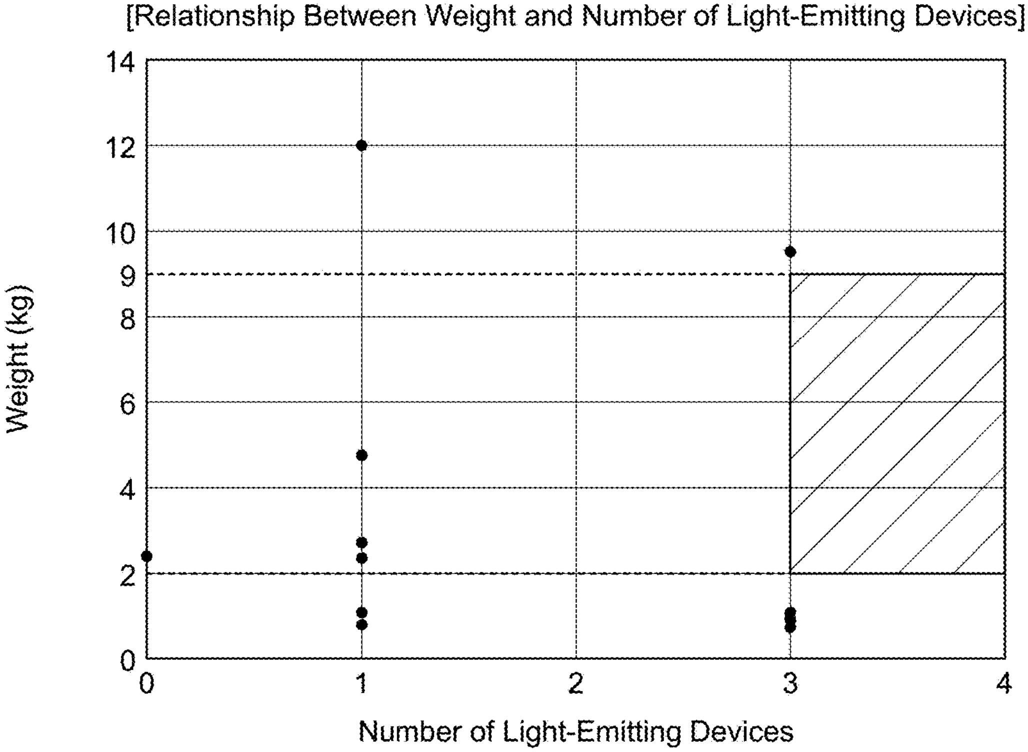
FIG. 7 is a graph that shows the relationship between weight of the impact tool and number of light-emitting devices according to the above-described known impact tools and the embodiment.

FIG. 7 is a graph that shows the relationship between weight of the impact tool and number of the light-emitting devices according to both the above-described known impact tools and the embodiment. In the graph shown in FIG. 7, the abscissa is the number of light-emitting devices, and the ordinate is the weight of the impact tool. The points shown in FIG. 7 plot the relationship between the weight of the impact tool and the number of the light-emitting devices for each product from Product A to Product L shown in FIG. 5.

As shown by the hatched area in FIG. 7, the impact tool 1 according to the embodiment comprises at least three of the light-emitting devices 60 and has a weight of 2 kg or more and 9 kg or less. An impact wrench comprising at least three of the light-emitting devices and having a weight of 2 kg or more and 9 kg or less does not exist in the above-described known impact tools.

It is noted that, in the impact tool 1 comprising the plurality of light-emitting devices 60 and wherein the maximum tightening torque of the anvil 10 is 1,000 N·m or more and 2,500 N·m or less, the weight of the impact tool 1 may be 2 kg or less.

Relationship Between Overall Length and Number of Light-Emitting Devices

In addition, to provide an impact tool 1 having improved ergonomics and/or work efficiency, it is effective to optimize the overall length of the impact tool 1. As shown in FIG. 1, overall length La of the impact tool 1 is the distance from a front-end portion of the anvil 10 to a rear-end portion of the motor-housing part 21.

Figure 8:
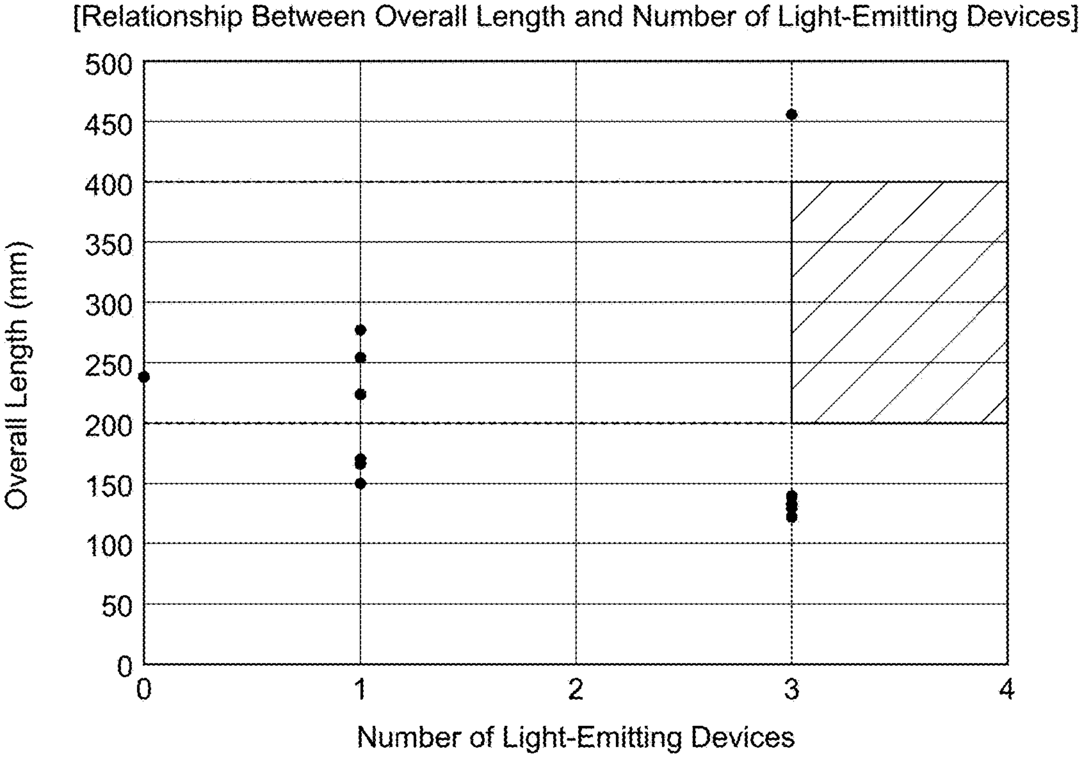
FIG. 8 is a graph that shows the relationship between overall length of the impact tool and number of light-emitting devices according to the above-described known impact tools and the embodiment.

FIG. 8 is a graph that shows the relationship between overall length of the impact tool and number of the light-emitting devices according to both the above-described known impact tools and the embodiment. In the graph shown in FIG. 8, the abscissa is the number of light-emitting devices, and the ordinate is the overall length of the impact tool. The points shown in FIG. 8 plot the relationship between overall length of the impact tool and number of the light-emitting devices for each product from Product A to Product L shown in FIG. 5.

As shown by the hatched area in FIG. 8, the impact tool 1 according to the embodiment comprises at least three of the light-emitting devices 60, and has overall length La of 200 mm or more and 400 mm or less. An impact wrench comprising at least three of the light-emitting devices and having an overall length of 200 mm or more and 400 mm or less does not exist in the above-described known impact tools.

It is noted that, in the impact tool 1 comprising the plurality of light-emitting devices 60 and wherein the maximum tightening torque of the anvil 10 is 1,000 N·m or more and 2,500 N·m or less, overall length La of the impact tool 1 may be 155 mm or less.

Relationship Between Maximum Rotational Speed of Anvil and Number of Light-Emitting Devices In addition, to provide an impact tool 1 having improved ergonomics and/or work efficiency, it is effective to optimize the maximum rotational speed of the anvil 10.

Figure 9:
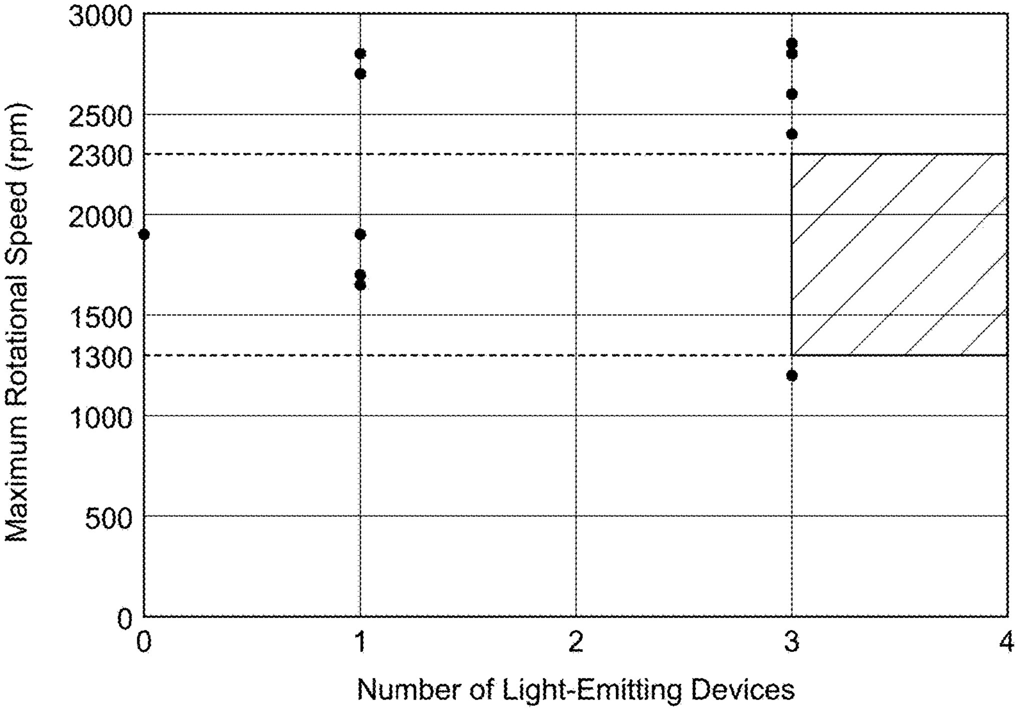
FIG. 9 is a graph that shows the relationship between maximum rotational speed of the anvil and number of light-emitting devices according to the above-described known impact tools and the embodiment.

FIG. 9 is a graph that shows the relationship between maximum rotational speed of the anvil and number of the light-emitting devices according to both the above-described known impact tools and the embodiment. In the graph shown in FIG. 9, the abscissa is the number of light-emitting devices, and the ordinate is the maximum rotational speed of the anvil. The points shown in FIG. 9 plot the relationship between maximum rotational speed of the anvil and number of the light-emitting devices for each product from Product A to Product L shown in FIG. 5.

As shown by the hatched area in FIG. 9, the impact tool 1 according to the embodiment comprises at least three of the light-emitting devices 60 and wherein the maximum rotational speed of the anvil 10 is 1,300 rpm or more and 2,300 rpm or less. An impact wrench comprising at least three of the light-emitting devices and wherein the maximum rotational speed is 1,300 rpm or more and 2,300 rpm or less does not exist in the above-described known impact tools.

It is noted that, in the impact tool 1 comprising the plurality of light-emitting devices 60 and wherein the maximum tightening torque of the anvil 10 is 1,000 N·m or more and 2,500 N·m or less, the maximum rotational speed of the anvil 10 may be 3,000 rpm or less.

Relationship Between Wrench Width of Anvil and Number of Light-Emitting Devices In addition, to provide an impact tool 1 having improved ergonomics and/or work efficiency, it is effective to optimize the wrench width of the anvil 10. As shown in FIG. 2, wrench width W1 of the anvil 10 is the dimension of one side of a cross section of the quadrangular-column part 10C.

Figure 10:
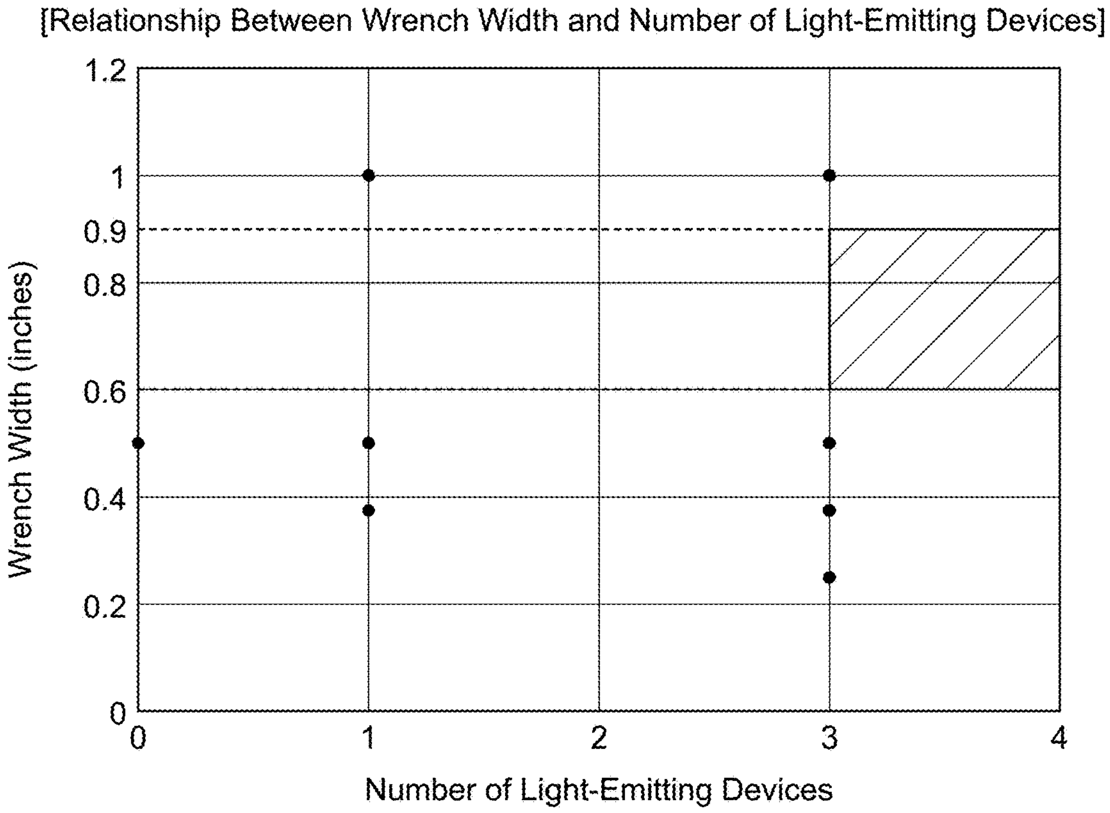
FIG. 10 is a graph that shows the relationship between wrench width of the anvil and number of light-emitting devices according to the above-described known impact tools and the embodiment.

FIG. 10 is a graph that shows the relationship between wrench width of the anvil and number of the light-emitting devices according to both the above-described known impact tools and the embodiment. In the graph shown in FIG. 10, the abscissa is the number of light-emitting devices, and the ordinate is the wrench width of the anvil. The points shown in FIG. 10 plot the relationship between wrench width of the anvil and number of the light-emitting devices for each product from Product A to Product L shown in FIG. 5.

As shown by the hatched area in FIG. 10, the impact tool 1 according to the embodiment comprises at least three of the light-emitting devices 60 and wherein the wrench width W1 of the anvil 10 is 0.6 inches or more and 0.9 inches or less. An impact wrench comprising at least three of the light-emitting devices and wherein the wrench width is 0.6 inches or more and 0.9 inches or less does not exist in the above-described known impact tools.

It is noted that, in the impact tool 1 comprising the plurality of light-emitting devices 60 and wherein the maximum tightening torque of the anvil 10 is 1,000 N·m or more and 2,500 N·m or less, wrench width W1 may be 0.375 inches or less.

Effects

As explained above, an impact tool 1 comprises: a motor 6; a spindle 8, which is rotated by the motor 6; a hammer 47, which is held on the spindle 8; an anvil 10, which is impacted in a rotational direction by the hammer 47; a housing 2, which houses the motor 6; and a hammer case 4, which is connected to the housing 2 and houses the hammer 47 and the spindle 8. The impact tool 1 comprises a light unit 18, which is held on the hammer case 4 and comprises a plurality of light-emitting devices 60. The maximum tightening torque of the anvil 10 is 1,000 N·m or more and 2,500 N·m or less.

According to the above-mentioned configuration, because the light unit 18 comprises the plurality of light-emitting devices 60, the work environment is brightly illuminated with illumination light. In addition, the maximum tightening torque of the anvil is 1,000 N·m or more and 2,500 N·m or less. Consequently, an impact tool 1 having improved ergonomics and/or work efficiency is provided.

In the embodiment, at least three of the light-emitting devices 60 are provided.

According to the above-mentioned configuration, because the light unit 18 comprises at least three of the light-emitting devices 60, the work environment is brightly illuminated with illumination light. Consequently, an impact tool 1 having improved ergonomics and/or work efficiency is provided.

In the embodiment, a battery pack 25 is mounted on a battery-holding part 23, which is a portion of the housing 2. The weight of the impact tool 1 is 2 kg or less.

According to the above-mentioned configuration, because the impact tool 1, with the battery pack 25 mounted thereon, has a weight of 2 kg or less, an impact tool 1 having improved ergonomics and/or work efficiency is provided.

In the embodiment, a battery pack 25 is mounted on a battery-holding part 23, which is a portion of the housing 2. At least three of the light-emitting devices 60 are provided. The weight of the impact tool 1 is 2 kg or more and 9 kg or less.

According to the above-mentioned configuration, because the light unit 18 comprises at least three of the light-emitting devices 60 and the impact tool 1, with the battery pack 25 mounted thereon, has a weight of 2 kg or more and 9 kg or less, an impact tool 1 having improved ergonomics and/or work efficiency is provided.

In the embodiment, the spindle 8 is disposed forward of the motor 6; the anvil 10 is disposed forward of the spindle 8; and the motor 6 is housed in a motor-housing part 21, which is a portion of the housing 2. The overall distance La, which is defined as the distance from a front-end portion of the anvil 10 to a rear-end portion of the motor-housing part 21, is 155 mm or less.

According to the above-mentioned configuration, because the overall length La of the impact tool 1, which is defined as the distance between the front-end portion of the anvil 10 and the rear-end portion of the motor-housing part 21, is 155 mm or less, an impact tool 1 having improved ergonomics and/or work efficiency is provided.

In the embodiment, the spindle 8 is disposed forward of the motor 6; the anvil 10 is disposed forward of the spindle 8; and the motor 6 is housed in a motor-housing part 21, which is a portion of the housing 2. At least three of the light-emitting devices 60 are provided. The overall distance La, which is defined as the distance from a front-end portion of the anvil 10 to a rear-end portion of the motor-housing part 21, is 200 mm or more and 400 mm or less.

According to the above-mentioned configuration, because the light unit 18 comprises at least three of the light-emitting devices 60 and the overall length La of the impact tool 1, which is defined as the distance from the front-end portion of the anvil 10 to the rear-end portion of the motor-housing part 21, is 200 mm or more and 400 mm or less, an impact tool 1 having improved ergonomics and/or work efficiency is provided.

In the embodiment, the maximum rotational speed of the anvil 10 is 3,000 rpm or less.

According to the above-mentioned configuration, because the maximum rotational speed of the anvil 10 is 3,000 rpm or less, an impact tool 1 having improved ergonomics and/or work efficiency is provided.

In the embodiment, at least three of the light-emitting devices 60 are provided. The maximum rotational speed of the anvil 10 is 1,300 rpm or more and 2,300 rpm or less.

According to the above-mentioned configuration, because the light unit 18 comprises at least three of the light-emitting devices 60 and the maximum rotational speed of the anvil 10 is 1,300 rpm or more and 2,300 rpm or less, an impact tool 1 having improved ergonomics and/or work efficiency is provided.

In the embodiment, the anvil 10 has a quadrangular-column part 10C. The wrench width W1, which is defined as the dimension of one side of a cross section of the quadrangular-column part 10C, is 0.375 inches or less.

According to the above-mentioned configuration, because the wrench width W1, which is defined as the dimension of one side of a cross section of the quadrangular-column part 10C, is 0.375 inches or less, an impact tool 1 having improved ergonomics and/or work efficiency is provided.

In one or more embodiments, the anvil 10 has a quadrangular-column part 10C. At least three of the light-emitting devices 60 are provided. The wrench width W1, which is defined as the dimension of one side of a cross section of the quadrangular-column part 10C, is 0.6 inches or more and 0.9 inches or less.

According to the above-mentioned configuration, because the light unit 18 comprises at least three of the light-emitting devices 60 and the wrench width W1, which is defined as the dimension of one side of a cross section of the quadrangular-column part 10C, is 0.6 inches or more and 0.9 inches or less, an impact tool 1 having improved ergonomics and/or work efficiency is provided.

In the embodiment, the light unit 18 comprises: a light circuit board 61, which is disposed at least partially around the hammer case 4 and holds a plurality of the light-emitting devices 60; and optical members 62, which are disposed forward of the light-emitting devices 60 and the light circuit board 61.

According to the above-mentioned configuration, the light-emitting devices 60 and the light circuit board 61 are protected by the optical members 62.

Modified Examples

Figure 11:
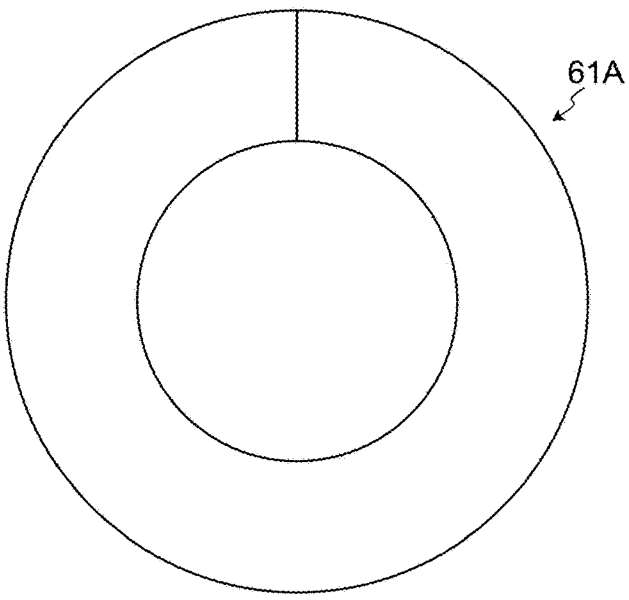
FIG. 11 is a drawing that schematically shows a modified example of a light circuit board.
Figure 12:
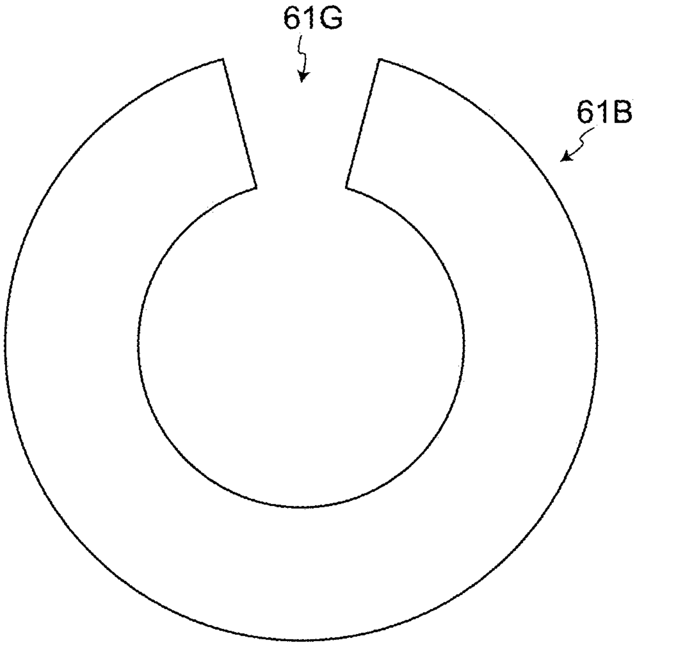
FIG. 12 is a drawing that schematically shows another modified example of the light circuit board.
Figure 13:
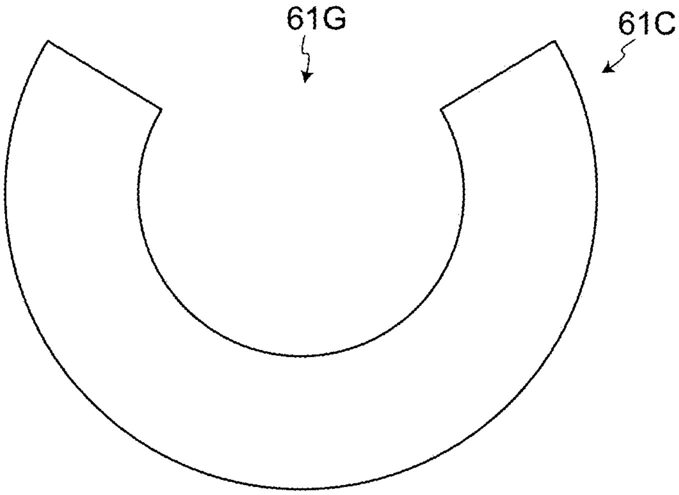
FIG. 13 is a drawing that schematically shows another modified example of the light circuit board.

FIGS. 11-13 schematically show modified examples of the light circuit board 61 according to the above-described embodiment. As shown in FIG. 11, a light circuit board 61A may have a ring shape. As shown in FIG. 12, a light circuit board 61B may have an arc shape. A gap 61G is provided between one-end portion and the other-end portion of the light circuit board 61B. As shown in FIG. 13, the gap 61G between one-end portion and the other-end portion of a light circuit board 61C may be large.

In the embodiments described above, it is assumed that the impact tool 1 is an impact wrench. The impact tool 1 may be an impact driver.

In the embodiments described above, the power supply of the impact tool 1 does not have to be the battery pack 25 and may be commercial power supply (AC power supply).

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved impact tools, such as impact wrenches and impact drivers.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

EXPLANATION OF THE REFERENCE NUMBERS

1 Impact tool
2 Housing
2L Left housing
2R Right housing
2S Screw
4 Hammer case
4A Hammer-housing part
4B Bearing-retaining part
5 Hammer-case cover
6 Motor
7 Speed-reducing mechanism
8 Spindle
8A Spindle-shaft part
8B Flange part
9 Impact mechanism
10 Anvil
10A Anvil-shaft part
10B Anvil-projection part
10C Quadrangular-column part
12 Fan
13 Battery-mounting part
14 Trigger switch
14A Trigger lever
14B Switch main body
15 Forward/reverse-change lever
16 Mode-change switch
17 Controller
18 Light unit
19 Air-intake opening

20 Air-exhaust opening
21 Motor-housing part
21A Tubular part
21B Rear-cover part
22 Grip part
23 Battery-holding part
24 Bearing box
25 Battery pack
26 Stator
27 Rotor
28 Stator core
29 Front insulator
30 Rear insulator
31 Coil
32 Rotor core
33 Rotor shaft
34 Rotor magnet
37 Sensor board
39 Rotor bearing
41 Pinion gear
42 Planet gear
42P Pin
43 Internal gear
44 Spindle bearing
45 Washer
46 Bearing
47 Hammer
48 Ball
49 Coil spring
60 Light-emitting device
61 Light circuit board
61A Light circuit board
61B Light circuit board
61C Light circuit board
61G Gap
62 Optical member
62A Light-transmitting part
62B Coupling part
62L Optical member
62R Optical member
63 Light cover
63A Opening
AX Rotational axis
H Thickness
L Length
La Overall length
W Width
W1 Wrench width

We claim:

1. An impact tool comprising:

a brushless motor, which includes a stator and a rotor configured to rotate relative to the stator;

a spindle, which is rotated by the brushless motor;

a hammer, which is held on the spindle, an anvil, which is impacted in a rotational direction by the hammer, the anvil having a quadrangular-column part and having a maximum tightening torque of 1,000 N·m or more and 2,500 N·m or less;

a bearing, which supports the anvil in a rotatable manner;

a polymer housing, which houses the brushless motor;

a hammer case, which is connected to the polymer housing, the hammer case including a hammer-housing part that houses the hammer and a bearing-retaining part that holds the bearing;

a hammer case cover, which covers at least a portion of the hammer case;

a light circuit board;

three or more light-emitting devices affixed on the light circuit board; and an optical member, which is disposed forward of the three or more light-emitting devices, wherein:

the optical member faces the three or more light-emitting devices and is configured to transmit illumination light emitted from the three or more light-emitting devices, the optical member, the three or more light-emitting devices and the light circuit board are all disposed around the bearing-retaining part and forward of a rear end of the anvil, and the hammer case cover is disposed entirely rearward of the optical member.

2. The impact tool according to claim 1, wherein the impact tool has a weight of 2 kg or more and 9 kg or less.

3. The impact tool according to claim 1, wherein a distance from a front end of the anvil to a rear end of the polymer housing is 200 mm or more and 400 mm or less.

4. The impact tool according to claim 1, wherein the anvil has a maximum rotational speed of 1,300 rpm or more and 2,300 rpm or less.

5. The impact tool according to claim 1, wherein the hammer case cover is entirely disposed rearward of the three or more light-emitting devices.

6. The impact tool according to claim 5, wherein a rearmost surface of the three or more optical members is located forward of a frontmost surface of the hammer-case cover.

7. The impact tool according to claim 6, wherein a rearmost surface of the light circuit board is located forward of the frontmost surface of the hammer-case cover.

8. The impact tool according to claim 1, wherein a rearmost surface of the light circuit board is located forward of a frontmost surface of the hammer-case cover.

9. An impact tool comprising:

a brushless motor, which includes a stator and a rotor configured to rotate relative to the stator;

a spindle, which is rotated by the brushless motor;

a hammer, which is held on the spindle, an anvil, which is impacted in a rotational direction by the hammer, the anvil having a quadrangular-column part and having a maximum tightening torque of 1,000 N·m or more and 2,500 N·m or less;

a polymer housing, which houses the brushless motor;

a hammer case, which is connected to the polymer housing;

a hammer case cover, which covers at least a portion of the hammer case;

a light circuit board;

three or more light-emitting devices affixed on the light circuit board; and three or more optical members, which are disposed forward of the three or more light-emitting devices;

wherein:

the three or more optical members respectively face the three or more light-emitting devices and are configured to transmit illumination light emitted from the three or more light-emitting devices, the three or more optical members, the three or more light-emitting devices and the light circuit board are all disposed forward of a rear end of the anvil, and the hammer case cover is entirely disposed rearward of the three or more optical members.

10. The impact tool according to claim 9, wherein the impact tool has a weight of 2 kg or more and 9 kg or less.

11. The impact tool according to claim 9, wherein a distance from a front end of the anvil to a rear end of the polymer housing is 200 mm or more and 400 mm or less.

12. The impact tool according to claim 9, wherein the anvil has a maximum rotational speed of 1,300 rpm or more and 2,300 rpm or less.

13. The impact tool according to claim 9, wherein the three or more optical members do not directly contact each other.

14. The impact tool according to claim 13, wherein:

the three or more optical members, the three or more light-emitting devices and the light circuit board are all disposed forward of a rear end of the anvil.

15. The impact tool according to claim 9, wherein a rearmost surface of the three or more optical members is located forward of a frontmost surface of the hammer-case cover.

16. The impact tool according to claim 15, wherein a rearmost surface of the light circuit board is located forward of the frontmost surface of the hammer-case cover.

17. An impact tool comprising:

a brushless motor, which includes a stator and a rotor configured to rotate relative to the stator;

a spindle, which is rotated by the brushless motor;

a hammer, which is held on the spindle, an anvil, which is impacted in a rotational direction by the hammer, the anvil having a quadrangular-column part and having a maximum tightening torque of 1,000 N·m or more and 2,500 N·m or less;

a polymer housing, which houses the brushless motor;

a hammer case, which is connected to the polymer housing;

a hammer case cover, which covers at least a portion of the hammer case;

a light circuit board;

three or more light-emitting devices affixed on the light circuit board; and three or more optical members, which are disposed forward of the three or more light-emitting devices;

wherein:

the three or more optical members respectively face the three or more light-emitting devices and are configured to transmit illumination light emitted from the three or more light-emitting devices, the three or more optical members are disposed forward of the hammer case cover, and a rearmost surface of the light circuit board is located forward of a frontmost surface of the hammer-case cover.

* * * * *